US006965406B1

(12) United States Patent
Ueda et al.

(10) Patent No.: US 6,965,406 B1
(45) Date of Patent: Nov. 15, 2005

(54) IMAGE PROCESSOR AND IMAGE PROCESSING METHOD

(75) Inventors: Kazuhiko Ueda, Kanagawa (JP); Masami Ogata, Kanagawa (JP); Takashi Tsuchiya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/548,684

(22) Filed: Apr. 13, 2000

(30) Foreign Application Priority Data

Apr. 16, 1999 (JP) ............................... P11-109172

(51) Int. Cl.[7] ............................................. H04N 5/208

(52) U.S. Cl. ...................... 348/252; 348/235; 348/254; 348/255; 358/518; 358/521; 382/264

(58) Field of Search .......................... 348/222.1, 223.1, 348/254, 255, 235; 358/518, 521; 382/274

(56) References Cited

U.S. PATENT DOCUMENTS 4,229,764 A * 10/1980 Danos ......................... 348/28
5,170,249 A 12/1992 Ohtsubo et al.
5,517,333 A * 5/1996 Tamura et al. .............. 358/518
5,550,955 A 8/1996 Morikawa
5,661,575 A 8/1997 Yamashita et al.
5,796,445 A * 8/1998 Nomura et al. ............. 348/607
6,101,271 A 8/2000 Yamashita et al.
6,252,995 B1 6/2001 Takamori
6,285,798 B1 * 9/2001 Lee ............................ 382/260
6,753,910 B1 * 6/2004 Ogata et al. ................ 348/235
6,768,514 B1 * 7/2004 Tsuchiya et al. ............ 348/252
6,823,086 B1 * 11/2004 Dolazza ...................... 382/261
2002/0034336 A1 * 3/2002 Shiota et al. ............... 382/274

* cited by examiner

*Primary Examiner*—Thai Tran
*Assistant Examiner*—Chriss S. Yoder
(74) *Attorney, Agent, or Firm*—Sonnenschein, Nath & Rosenthal LLP

(57) ABSTRACT

The present invention relates to an image processor and an image processing method for compensating gradation by effectively avoiding drop of partial contrast through application to an image processor such as television receiver, video tape recorder, television camera and printer or the like. A domain to which an input image data belongs is judged, for example, with reference to the low frequency element r (i, j) of the pixel value x (i, j) and the signal level x (i, j) of the image data forming an input image VT is compensated on the basis of the result of judgment r(i, j).

6 Claims, 13 Drawing Sheets

| | | | | |
|---|---|---|---|---|
| Ye | Cy | Ye | Cy | |
| Mg | G | Mg | G | |
| Ye | Cy | Ye | Cy | |
| G | Mg | G | Mg | |

IMAGE PROCESSOR AND IMAGE PROCESSING METHOD

BACKGROUND OF THE INVENTION

1. Field of the Invention

The present invention relates to an image processor and image processing method which may be adapted, for example, to an image processor such as television receiver, video tape recorder, television camera and printer or the like. The present invention judges a domain to which image data belongs, for example, with reference to low frequency element of a pixel value and compensates for signal level of image data based on the result of judgment in order to compensate for gradation by effectively avoiding deterioration of partial contrast.

2. Description of the Related Art

In an image processor such as television camera or the like of the related art, an output signal is provided after compensation for gradation of image data which is obtained through an image input means such as an image sensing means.

FIG. 15 is a characteristic curve illustrating an input/output characteristic of a signal processing circuit adapted to such gradation compensating process. A signal processing circuit of this type reduces the gain when an input level 1 exceeds the predetermined reference level 1*k*. Thereby, the signal processing circuit of this type outputs a suppressed signal level when the input level becomes higher than the reference level 1*k*. In this case, gradation is compensated by sacrificing contrast of the part in the higher signal level.

In the characteristic curve of FIG. 15, the horizontal axis shows a pixel value l indicating an input level of image data, while the vertical axis shows a pixel value T(l) indicating an output level of image data. Moreover, $L_{max}$ shows the maximum level which each pixel of input/output image can take. In the following explanation, a function indicating an input/output relationship as indicated in the characteristic curve is called a level conversion function.

FIG. 16 is a characteristic curve showing the input/output characteristic of a signal processing circuit of the same type. The signal processing circuit based on this level conversion function reduces the gain when the input level 1 is the first reference level 1*s* or less and the second reference level 1*b* or more. Thereby, this signal processing circuit is caused to compensate for gradation by sacrificing contrast at the part of low signal level and high signal level.

Meanwhile, in the image processing utilizing a computer, gradation is compensated, for example, by histogram equalization.

In this histogram equalization method, the level conversion function is adaptively changed depending on frequency distribution of pixel value if an input image and moreover gradation is compensated by reducing gradation of the part having lower frequency distribution of pixel value.

Namely, as illustrated in FIG. 17, in the process of histogram equalization, accumulated frequency distribution C(1) by the arithmetic operation of the following formula is detected based on the frequency distribution H(1) which is collection of the number of pixels with reference to the pixel value l of the input image.

$$C(1) = \sum_{h=0}^{1} H(k) \tag{1}$$

In the histogram equalization process, the level conversion function T(l) is defined by normalizing the accumulated frequency distribution C(l) detected as explained above with the following formula and the signal level of input image is compensated depending on this level conversion function T(l). Here, $F_{max}$ is the final value of the accumulated frequency distribution C(l) and $L_{max}$ is the maximum value of the input/output level.

$$T(1) = \frac{C(1)}{Fmax} \times Lmax \tag{2}$$

Such process to compensate for gradation is executed as required for suppression of dynamic range even when image data is transmitted to the transmission line and when image data is displayed on a display unit or when image data is stored in a storage apparatus.

In the gradation compensating process by the method of the related art, total gradation is compensated by sacrificing contrast of a certain part in order to avoid generation of unnatural image and to convert the level with the input/output function having the monotonous increasing characteristic even in any kind of method.

Therefore, the method of the related art has a problem that contrast is partially lowered in the processed image.

SUMMARY OF THE INVENTION

The present invention has been proposed considering the problems explained above and therefore it is an object of the present invention to provide an image processor and an image processing method which can compensate for gradation by effectively avoiding drop of partial contrast.

In view of solving the problems, in the image processor and image processing method of the present invention, a domain to which image data belongs is judged, a compensation coefficient for compensating for pixel value of image data is generated based on the result of judgment and a pixel value of image data is compensated depending on such compensation coefficient.

A domain to which image data belongs is judged, a compensation coefficient for compensating for pixel value of image data is generated and a pixel value of image data is compensated depending on such compensation coefficient. Thereby, the pixel value is compensated with the same coefficient in the same domain to maintain relationship of pixel values within the domain and such relationship of pixel values may also be inverted among the pixels belonging to different domains. Accordingly, it is now possible to compensate for total gradation by avoiding partial deterioration of contrast.

DESCRIPTION OF THE PREFERRED EMBODIMENTS

The preferred embodiments of the present invention will be explained in detail with reference to the accompanying drawings.

(1) First Embodiment

(1-1) Structure of the First Embodiment

Figure 1:
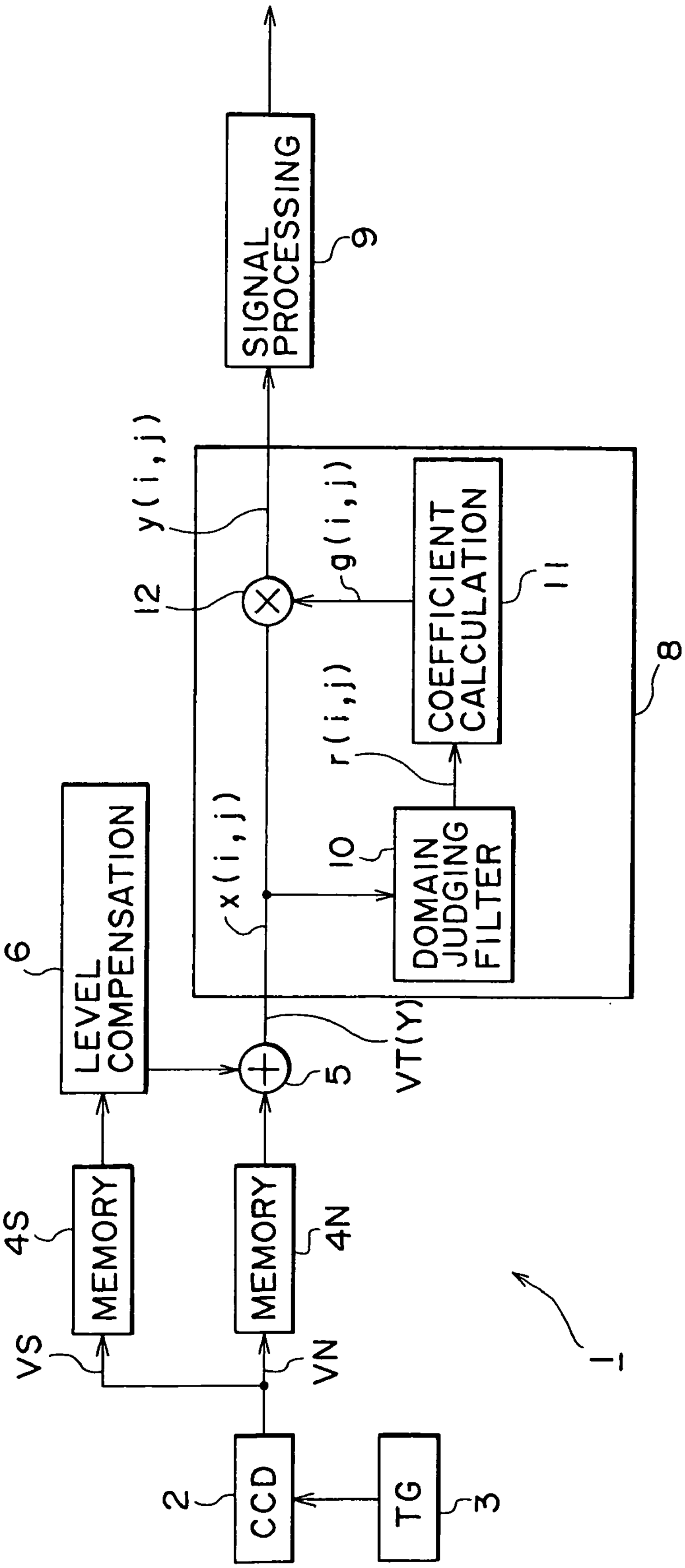
FIG. 1 is a block diagram illustrating a television camera as a first embodiment of the present invention.

FIG. 1 is a block diagram illustrating a television camera in relation to the first embodiment of the present invention. In this television camera 1, a CCD solid-state image sensing device (CCD) 2 outputs an image sensing result when it is driven by a timing generator (TG) 3. In this case, the CCD2 solid-state image sensing device 2 obtains an image sensing device in the period of 1/60 (sec) depending on the charge accumulation time preset by a user and then outputs the image sensing result as the image sensing result VN by the ordinary exposing process. Moreover, the CCD solid-state image sensing device 2 obtains the image sensing result during the charge accumulation time which is shorter than that by the ordinary exposing process in the vertical blanking period of the image sensing result VN by such ordinary exposing process and then outputs such image sensing result as the image sensing result of short term exposing process.

Figure 2A:
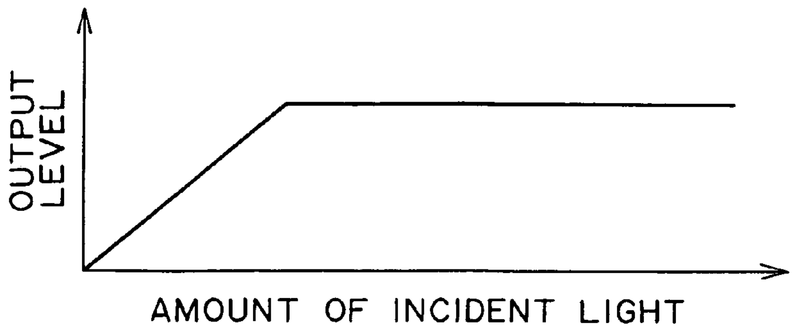
FIGS. 2A to 2C illustrate characteristic curves for explaining the process of image sensing by the television camera.
Figure 2B:
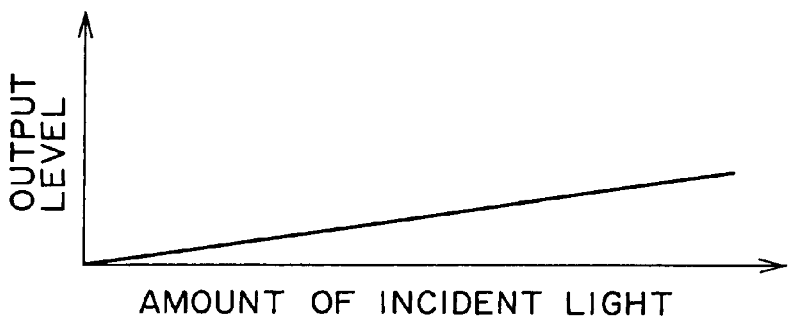
Figure 2C:
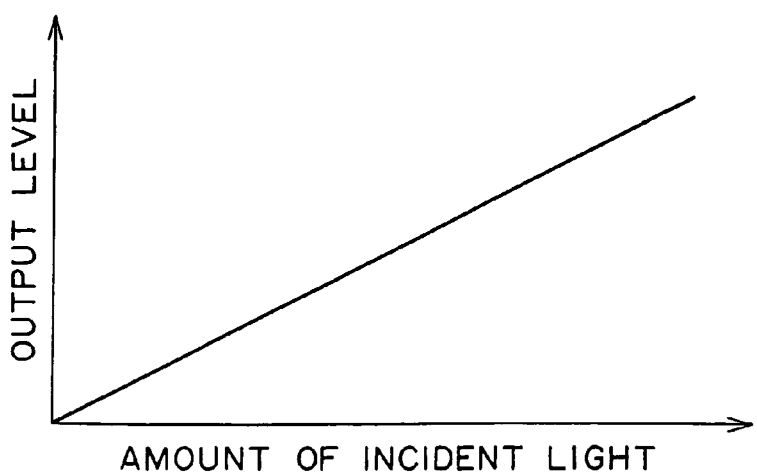

Thereby, as illustrated in FIG. 2, the CCD solid-state image sensing device 2 outputs, when amount of incident light is higher than the predetermined amount, a set of the image sensing result VN (FIG. 2A) by the ordinary exposing process in which the output level is saturated and the image sensing result VS (FIG. 2B) of the short term exposing process in which an output level is not saturated during the shorter charge accumulation time.

A memory 4N inputs the image sensing result VN (converted to the color signals of red, blue and green) by such ordinary exposing process through a correlated double sampling circuit, a fault compensating circuit, a matrix arithmetic circuit and an analog/digital converting circuit or the like not illustrated and then outputs the image sensing result VN by the ordinary exposing process after this result is temporarily stored.

In the same manner, a memory 4S inputs the image sensing result VS by this short term exposing process through a correlated double sampling circuit, a fault compensating circuit, a matrix arithmetic circuit and an analog/digital converting circuit or the like not illustrates and then outputs the image sensing result VS by this short term exposing process after it is temporarily stored.

An adding circuit 5 adds the image sensing result VN by the ordinary exposing process stored in the memory 4N and the image sensing result VS by the short term exposing process stored in the memory 4S to output the image sensing result VT of wide dynamic range and sufficient pixel value, while a level compensating circuit 6 outputs, through compensation, the pixel value of the image sensing result VS by the short term exposing output from the memory 4S in view of obtaining sufficient linearity for practical use in the image sensing result VT by this adding circuit 5.

Thereby, in the television camera 1, the image sensing result VT (FIG. 2C) of remarkably wider dynamic range in comparison with that in the related art can be generated.

The gradation compensating circuit 8 outputs, through compensation, gradation of the image sensing result VT by compensating for the pixel value of this image sensing result VT. A subsequent signal processing circuit 9 executes various signal processes required for the television camera and then outputs the image sensing result to external devices. In this case, the dynamic range of image sensing result is suppressed by uniformly suppressing the pixel value of the image sensing result corresponding to the output device.

In this process, the gradation compensating circuit 8 preliminarily executes the arithmetic process indicated by the following formula to generate a luminance signal Y from the image sensing result VT by the color signals R, G, B and outputs, through compensation, the gradation of color signals R, G, B with reference to the luminance signal Y.

$$Y=0.3R+0.59G+0.11B \tag{3}$$

Here, in the gradation compensating circuit 8, a domain judging filter 10 judges a domain to which image data which is a luminance signal Y belongs and outputs the result of judgment. In this case, the domain judging filter 10 detects a mean luminance level which is the mean value of pixel values as the characteristic amount indicating the characteristic of the neighboring predetermined range of image data to judge to which domain of the mean luminance level the image data belongs and then outputs the mean value which is the mean luminance level as the result of judgment.

Namely, the domain judging filter 10 is a two-dimensional low-pass filter which detects a low frequency element r (i, j)

represented by the following arithmetic formula for the pixel value x (i, j) of the luminance signal Y in the image sensing result VT sequentially input in the sequence of the raster scanning and also outputs the low frequency element r (i, j) as the result of judgment.

$$r(i,\ j) = \sum_{dj=-N/2}^{N/2} \sum_{di=-M/2}^{M/2} \frac{x(i+di,\ j+dj)}{M \times N} \tag{4}$$

Figure 3:
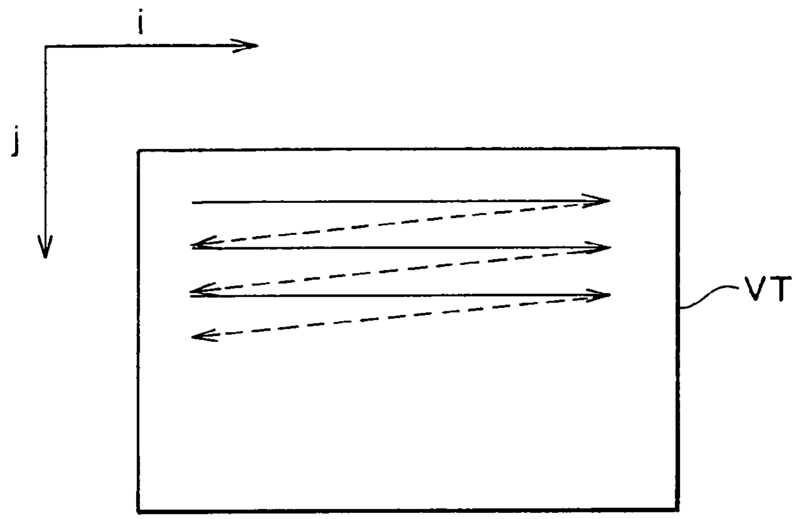
FIG. 3 is a schematic diagram illustrating arrangement of pixel values in the television camera of FIG. 1.

N, M in the formula (3) are constant indicating a size of neighboring domain to calculate the mean value. Moreover, as illustrated in FIG. 3, in this embodiment, regarding the image sensing result VT input in the sequence of raster scanning, the horizontal direction is indicated by the subscript of code i, while the vertical direction by the subscript of code j. Therefore, the domain judging filter 10 can extract the domain in which the pixel values are comparatively flat by eliminating the more minute structure than that in the image of the image sensing result VT. Here, the domain judging filter 10 preferably has a comparatively narrow frequency band because of the purpose to execute the process explained above.

Figure 4:
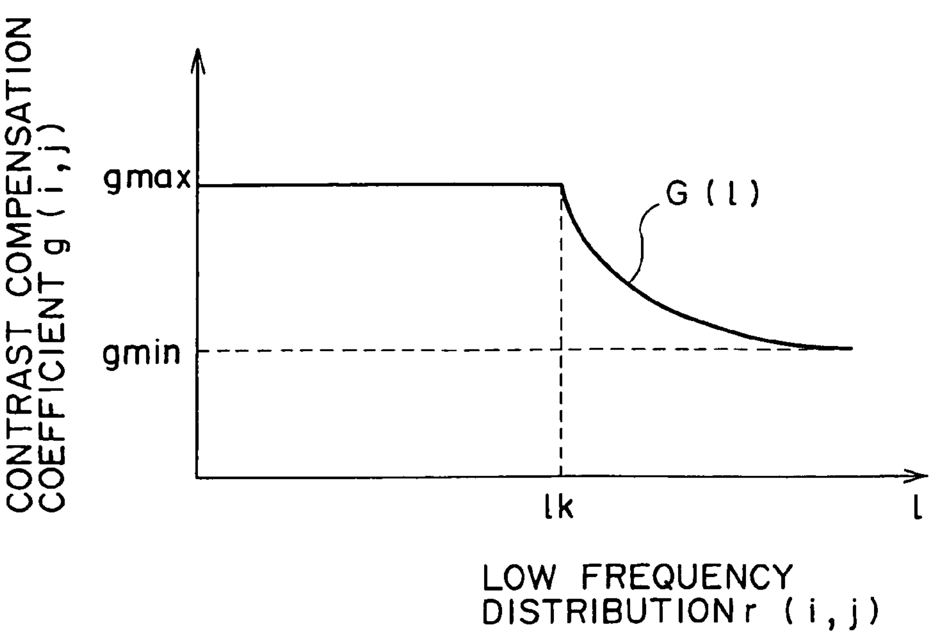
FIG. 4 illustrates characteristic curve for explaining the contrast compensation coefficient g (I, j).

A coefficient calculating circuit 11 generates, for example, a contrast compensation coefficient g (i, j) with a coefficient calculating function G illustrated in FIG. 4 depending on the signal level of the low frequency element r (i, j). Here, the coefficient calculating function G can be obtained, for example, through the arithmetic process of the level converting function T(l) conforming to the following formula explained with reference to FIG. 15.

$$G(1) = \frac{T(1)}{1} \tag{5}$$

Thereby, the coefficient calculating circuit 11 generates and inputs the contrast compensation coefficient g (i, j) by the arithmetic process of the following formula, outputs the contrast compensation coefficient g (i, j) by the constant value $g_{max}$ of value 1 or larger for the domain in which the signal level of the low frequency element r (i, j) as the input level and also outputs the contrast compensation coefficient g (i, j) which gradually comes close to the value $g_{min}$ depending on the signal level of the low frequency element r (i, j) for the domain in which the signal level is the reference level 1*k* or higher.

$$g(i,\ j)=G(r(i,\ j)) \tag{6}$$

A multiplying circuit 12 outputs, through compensation, the signal level of the image sensing result TV with the contrast compensation coefficient g (i, j) by multiplying (in this case, the process for each color signal) the contrast compensation coefficient g (i, j) generated as explained above and the pixel value x (i, j) of the corresponding image sensing result VT.

(1-2) Operations of the First Embodiment

In above structure, in the television camera 1 (FIG. 1), the image sensing result VN (FIG. 2A) by the ordinary exposing process during the charge accumulation period set by a user and the image sensing result VS (FIG. 2B) by the short term exposing during the short charge accumulation period are alternately output from the CDD solid-stage image sensing device 2 and these image sensing results VN and VS are respectively stored in the memories 4N and 4S. In the television camera 1, these two image sensing results VN and VS are combined by the level compensating circuit 6 and adding circuit 5. Thereby, the image sensing result VT (FIG. 2C) having remarkably wider dynamic range than that of the related art can be generated.

In this image sensing result VT, the luminance signal Y is generated, a means value of pixel values which is the characteristic amount indicating the characteristic of neighboring predetermined range of the input image data is detected in the domain judging filter 10 of the gradation compensating circuit 8. Thereby, result of judgment indicating the domain to which the input image data belong can be generated. In more practical, the domain judging filter 10 detects the low frequency element r (i, j) which is a means value of the pixel values to thereby eliminate a minute structure in the image and also extracts the domain in which the pixel values are comparatively flat. Moreover, this low frequency element r (i, j) is output as the result of judgment.

In the image sensing result VT, the contrast compensation coefficient g (i, j) is generated depending on the signal level of this low frequency element r (i, j) by the subsequent coefficient calculating circuit 11, the pixel value is compensated in the multiplying circuit 12 by this contact compensation coefficient g (i, j). Thereby, the pixel value is compensated by the gain depending on each domain with reference to the low frequency element r (i, j) and is then output.

Therefore, in the image sensing result VT, the pixel value is compensated by the equal gain in the domains where the signal level of the low frequency element r (i, j) is equal but the pixel value may be approximated depending on the setting of the level converting function T(1) in the domains where the signal levels of the low frequency element r (i, j) are different. Moreover, in some cases, the relationship among the small and large pixel values may be inverted. Thereby, the contrast in each domain can naturally be increased for the total gradation and total gradation can also be compensated by effectively avoiding deterioration of partial contrast.

Figure 15:
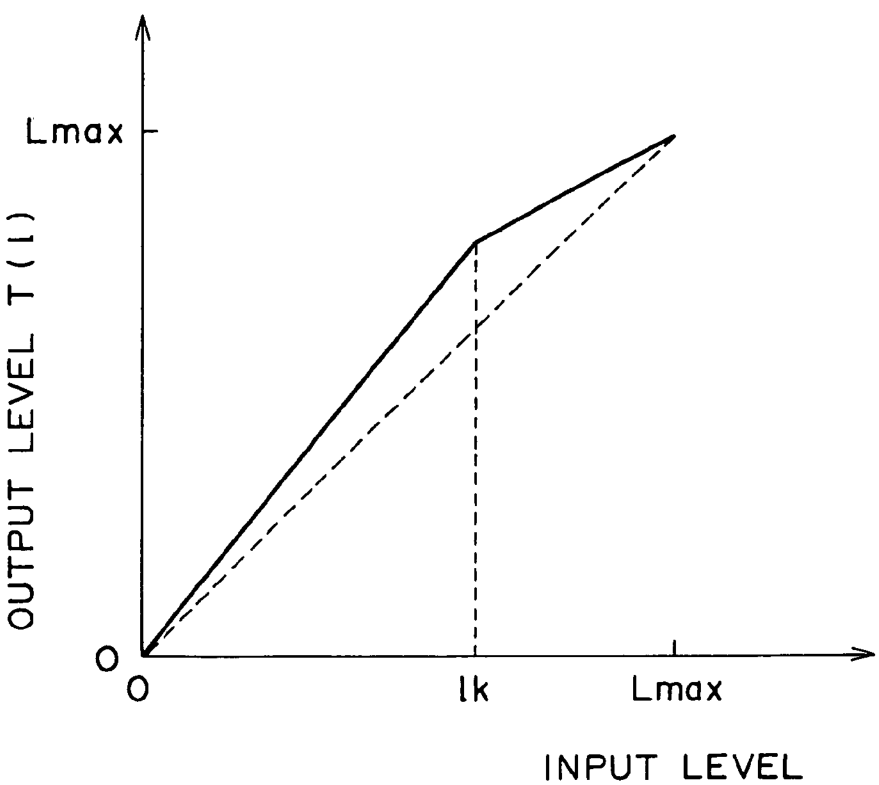
FIG. 15 illustrates a characteristic curve for explaining a level converting function adapted to the dynamic range suppressing process in the related art.
Figure 16:
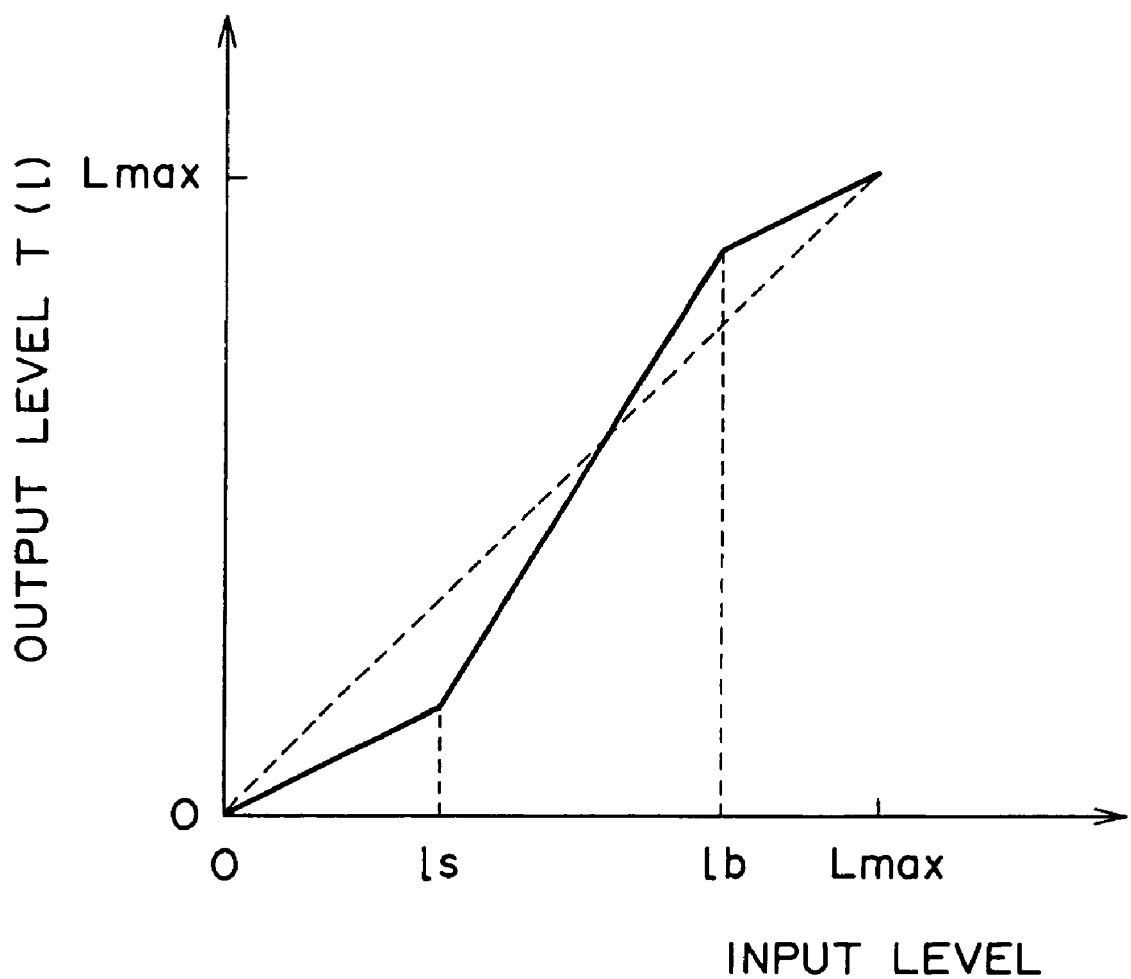
FIG. 16 illustrates a characteristic curve for explaining a level converting function adapted to the dynamic range suppressing process in the other embodiment different from that of FIG. 15.
Figure 17:
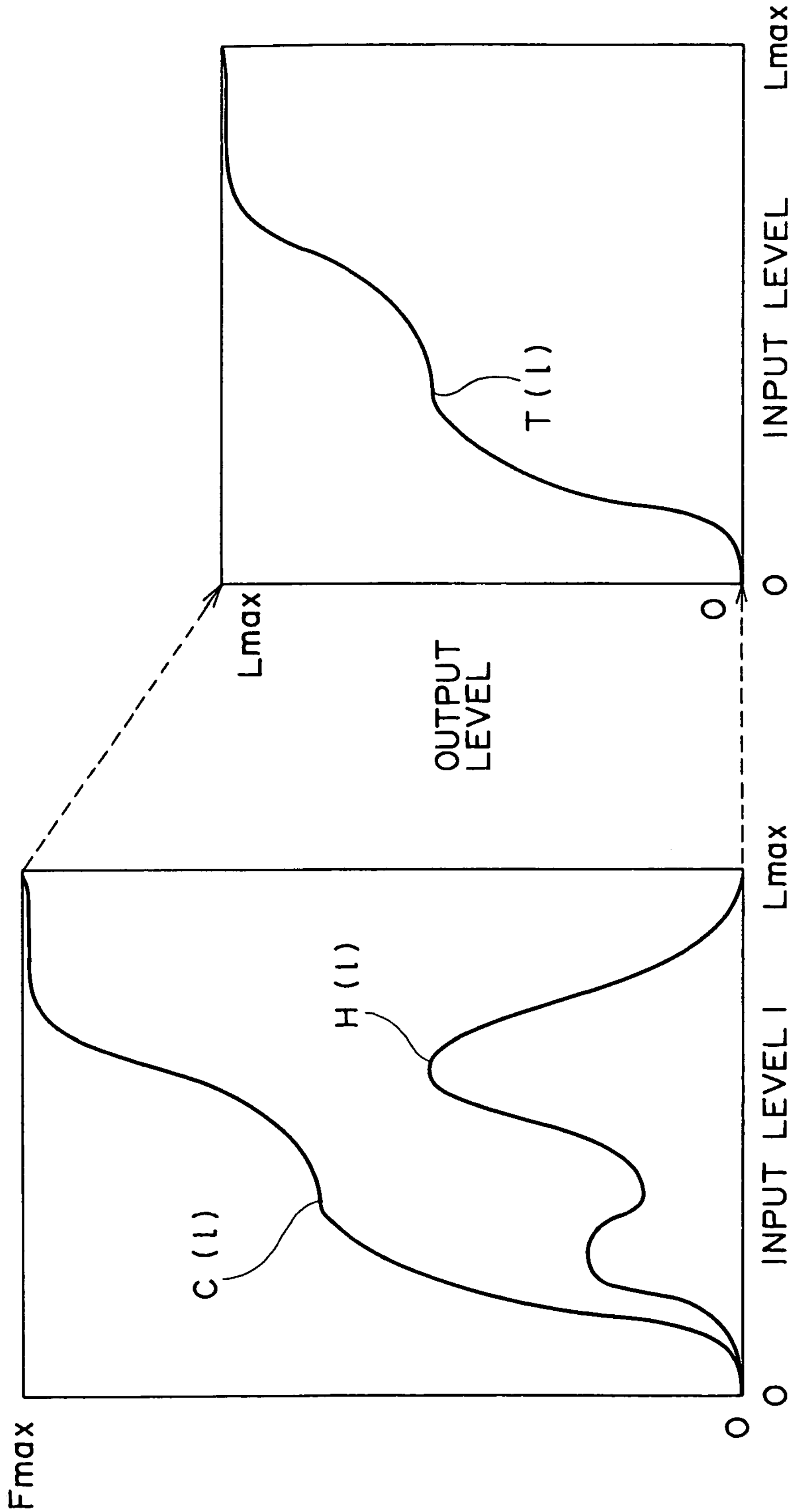
FIG. 17 illustrates characteristic curves for explaining the histogram equalization process.

Namely, as illustrated in FIGS. 5A to 5D, the pixel value x (i, j) of the image sensing result VT pulsates depending on the frequency higher than the cutoff frequency of the low-pass filter 10. Moreover, when the DC level of the pixel value x (i, j) rises suddenly (FIG. 5B) and change of the low frequency element r (i, j) corresponding to sudden change of DC level rides over the point of inflexion of the coefficient calculation function G(l), the contrast is suppressed at the part where the pixel value x (i, j) is large, depending on the level converting function of the related art explained with reference to FIG. 15 (FIG. 15C).

Figure 5A:
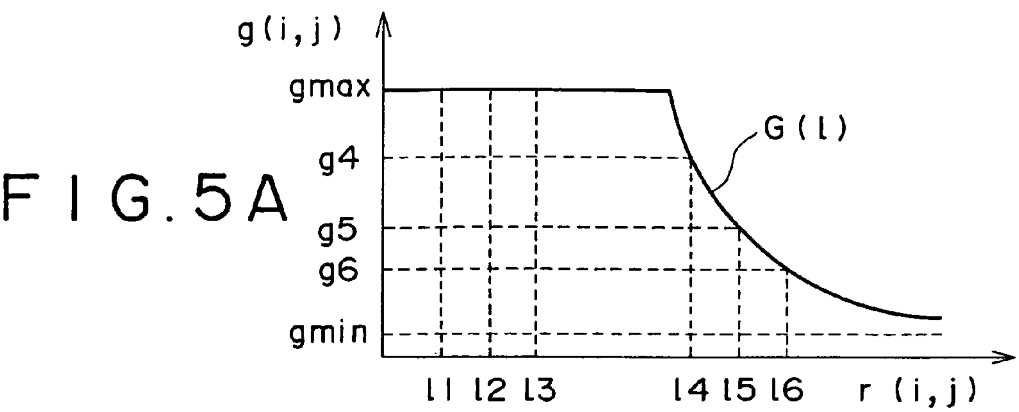
FIGS. 5A to 5D illustrate signal waveforms for explaining the process of a gradation compensating circuit in the television camera of FIG. 1.
Figure 5B:
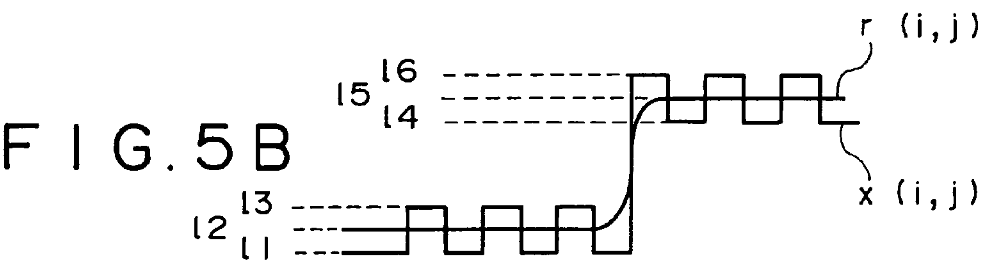
Figure 5C:
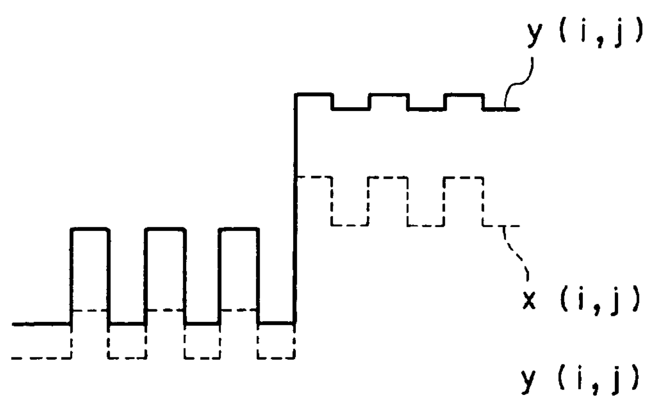
Figure 5D:
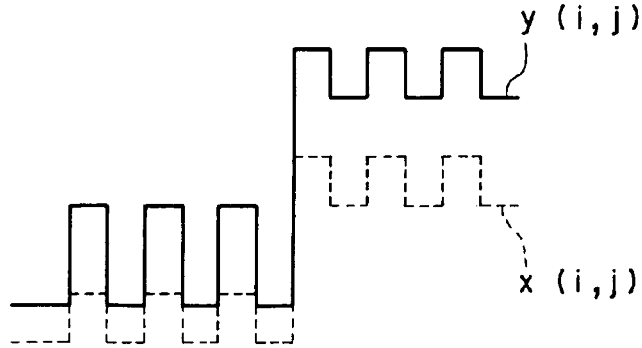

However, according to this embodiment, before and after the signal level of low frequency element r (i, j) suddenly rises, the pixel value x (i, j) is compensated by the gain depending on the signal level of such low frequency element r (i, j) and the signal level can be compensated by setting the coefficient calculating function G (l). In this case, at the part where the pixel value x (i, j) is small, the pixel value x (i, j) is compensated by the gain $g_{max}$ based on the mean level 12 of the peak value 13 and bottom value 11 and thereby the contrast which is identical to that in the related art can be obtained for the low level domains (FIG. 5D).

On the other hand, in the high level side, the pixel value x (i, j) is compensated by the gain g5 based on the mean level 15 of the peak value 16 and bottom value 14. In this case, since the pixel value is compensated by the gain having uniform peak value 16 and bottom value 14, the signal is amplified by this gain g5 in the contrast between the peak value 16 and bottom value 14.

Accordingly, in this embodiment, gradation is never changed to a large extent from the macroscopic point of view but pulsating due to the image sensing result VT as the input image can be expanded from the microscopic point of view.

Figure 6A:
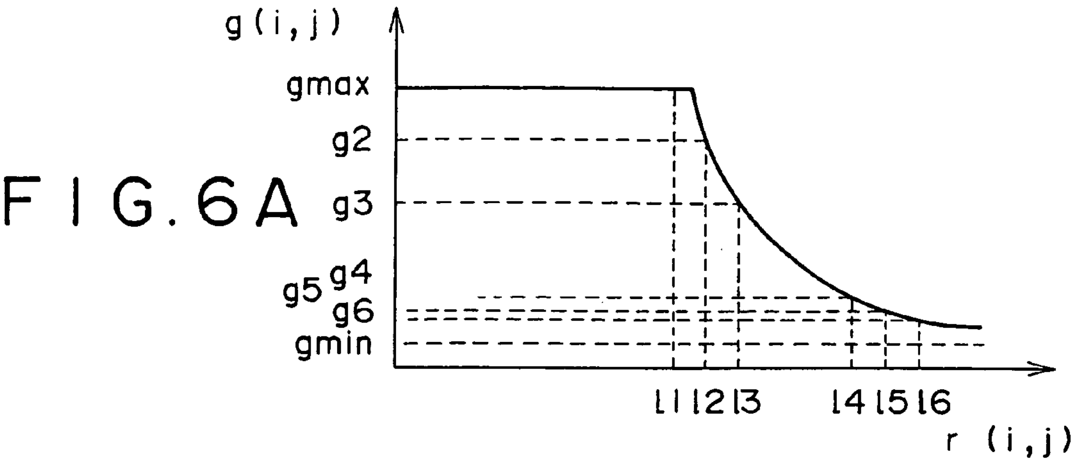
FIGS. 6A to 6D illustrate signal waveforms for explaining the process of a gradation compensating circuit in the input level which is different from that of FIGS. 5A to 5D.
Figure 6B:
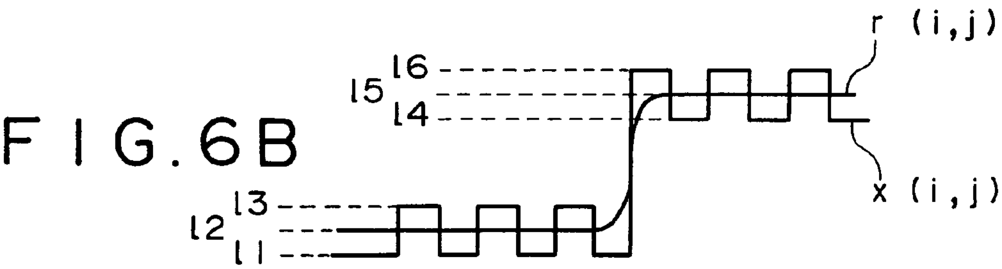
Figure 6C:
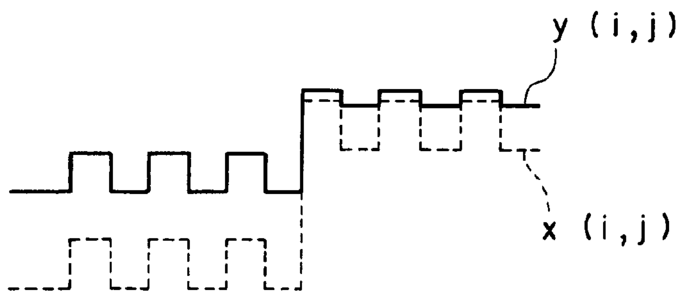
Figure 6D:
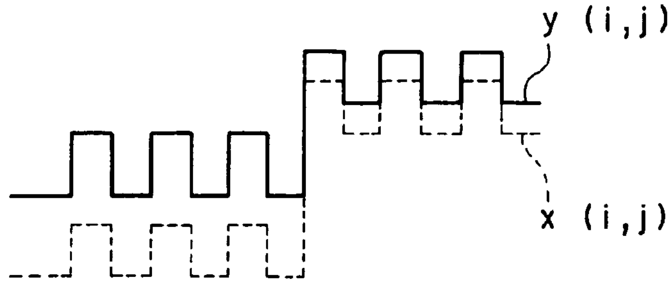

Moreover, as illustrated in FIGS. 6A to 6D, in the same manner, the pixel value x (i, j) pulsates and DC level rises suddenly (FIG. 6B). When pulsating of the pixel value x (i, j) is deviated to the high level side from the pint of inflexion of the coefficient calculating function G(1) (FIG. 5B), the contrast is suppressed in all pixel values x (i, j) depending on the level converting function of the related art explained with reference to FIG. 15 (FIG. 6C).

However, in this case, the pixel value is also compensated by the gains g2 and g5 corresponding to the mean value levels 12 and 15 in the low level and high level sides and the gradation is never changed to a large extent from the macroscopic point of view but large pulsating due to the image sensing result VT as the input image can be expanded from the microscopic point of view.

(1-3) Effect of the First Embodiment

According to above structure, the domain to which the image data belongs is judged, the pixel values may be approximated as required among the pixels belonging to different domains while the relationship of small and large pixel values are maintained by the equal coefficient within the same domain by generating the compensation coefficient for compensating pixel value of image data based on the result of judgment and also compensating the pixel value of image data depending on the compensation coefficient and moreover such relationship can also be inverted in the extreme case. Thereby, the contrast in each domain can be expanded in the predetermined level range and total gradation can be compensated by avoiding drop of the partial contrast.

Moreover, in this case, total gradation can be compensated by avoiding drop of partial contrast with a simplified structure by utilizing the low frequency element by the low-pass filter is used as the characteristic amount to compensate for the pixel value with reference to this low frequency element.

(2) Second Embodiment

Figure 7:
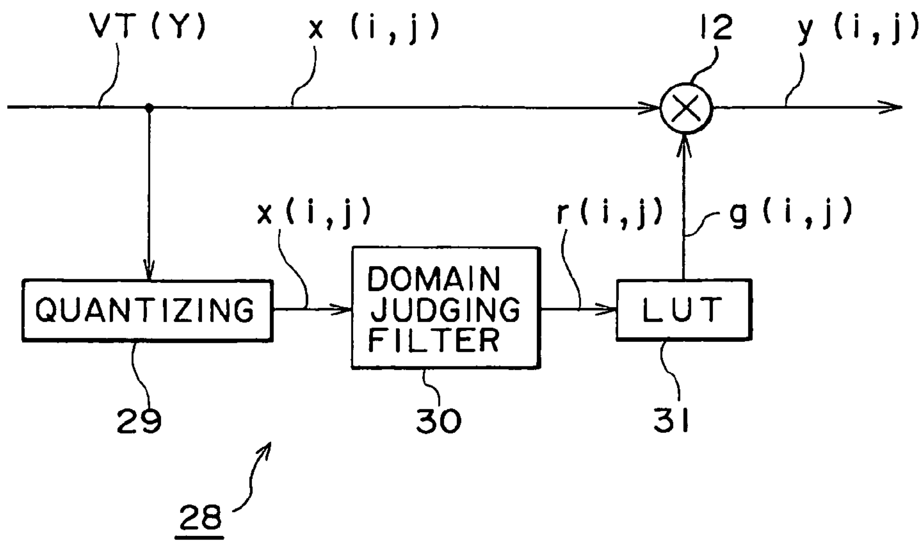
FIG. 7 is a block diagram illustrating a gradation compensating circuit adapted to the television camera in relation to the second embodiment of the present invention.

FIG. 7 is a block diagram illustrating the gradation compensating circuit adapted to the television camera in relation to the second embodiment of the present invention. This gradation compensating circuit 28 is adapted in place of the gradation compensating circuit 8 explained with reference to FIG. 1.

Here, a quantizing circuit 29 reduces the number of bits and then output it by quantizing the pixel value of the luminance signal Y forming the image sensing result VT. In this embodiment, the quantizing circuit 29 executes the arithmetic process of the following formula in the preset quantizing step Q for the pixel value x (i, j) and thereby outputs the pixel value x'(i, j) by the linear quantizing process of the pixel value x (i, j). Here, int(a) is a function to truncate the fraction part after the decimal point of a.

$$x'(i,\ j) = int\left(\frac{x}{Q} + 0.5\right) \tag{7}$$

A domain judging filter 30 is formed in the same structure as the domain judging filter 10 of the first embodiment, except for the point that the number of bits is different.

A look-up table (LUT) 31 forms a coefficient calculating circuit of the first embodiment and outputs a compensation coefficient g(i, j) using, as the address, the low frequency element r (i, j) output from the domain judging filter 30. Thereby, the look-up table 31 stores the compensated coefficient LUT (i) indicated by the following formula in the i-th address.

$$\mathrm{LUT}(i)=G(i\times Q) \tag{8}$$

According to the above structure, the effect similar to that of the first embodiment can be obtained even by previously quantizing the pixel value. Moreover, the total processes can as much simplified by generating the compensation coefficient with the look-up table. In addition, preceding quantizing also enables simplification of the structure of domain judging filter and also reduces in size the look-up table.

(3) Third Embodiment

Figure 8:
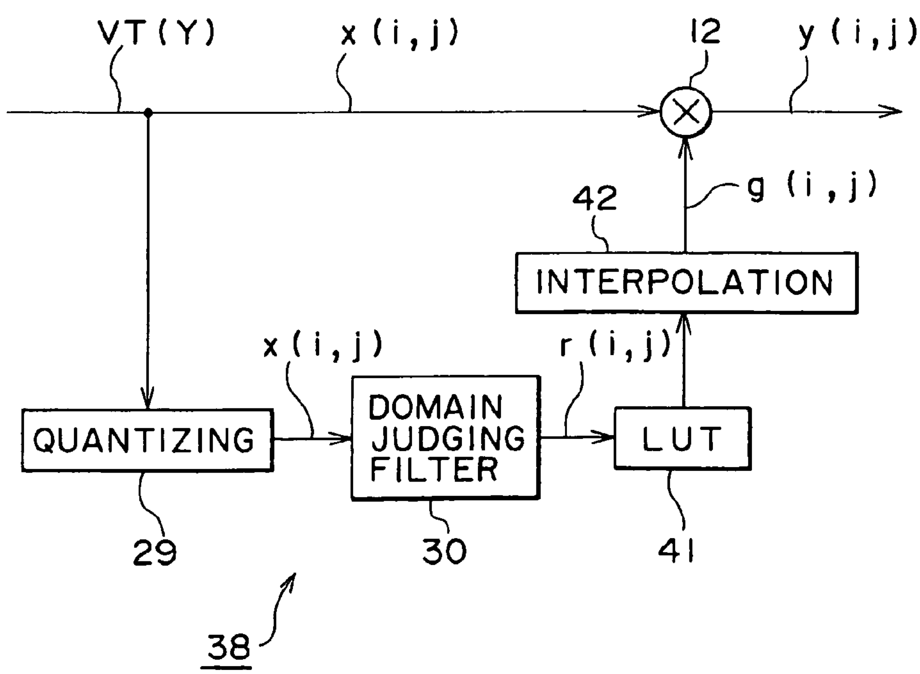
FIG. 8 is a block diagram illustrating a gradation compensating circuit adapted to the television camera in relation to the third embodiment of the present invention.

FIG. 8 is a block diagram illustrating a gradation compensating circuit adapted to the television camera in relation to the third embodiment of the present invention. This gradation compensating circuit 38 is adapted in place of the gradation compensating circuit 28 explained with reference to FIG. 7 and the look-up table 41 and compensating circuit 42 are arranged in place of the look-up table 31 of this gradation compensating circuit 28.

Here, the look-up table 41 has addresses which are less than the number of levels which the output value r (i, j) of the domain judging filter 30 can take and outputs the two addresses addr0 (i, j) and addr 1 (i, j) and compensation coefficients g0 (i, j), g1 (i, j) expressed by the following formula through the access in which the predetermine lower bits of the output value r (i, j) is omitted. Here, the look-up table 41 generates and outputs the addresses addr 0 (i, j) and addr 1 (i, j) by outputting the output value r (i, j) of the domain judging filter 30 through omission of the lower bits for the address addr 0 (i, j) and adding the bit of logic 1 to the least significant bit of the address addr0 (i, j) for the address addr 1 (i, j). Here, $R_{max}$ is the maximum value which the output value x (I, j) of the domain judging filter 30 can take, while $R'_{max}$ is the maximum value which the address of look-up table 41 can take.

$$addr0(i,\ j) = int\left(\frac{r(i,\ j)}{Rmax} \times R'\max\right) addr1(i,\ j) = addr0(i,\ j) + 1 \tag{9}$$

An interpolating circuit 42 executes the interpolating arithmetic process of the following formula using the addresses addr 0 (i, j), addr 1 (i, j), compensation coefficients g0 (i, j), g1 (i, j) input from the look-up table 41 and then outputs the interpolation result as the compensation coefficient g(i, j).

$$g(i,j)=\frac{r'(i,j)-addr0(i,j)}{addr1(i,j)-addr0(i,j)}\times(g1(i,j)-g0(i,j))+g0(i,j)\quad r'(i,j)=\frac{r(i,j)}{Rmax}\times R'\max \tag{10}$$

According to the structure illustrated in FIG. 8, the compensation coefficient of which value changes smoothly can be generated using the small-scale look-up table and gradation can also be compensated with as much higher accuracy by generating the compensation coefficient through the interpolation calculating process.

(4) Fourth Embodiment

Figure 9:
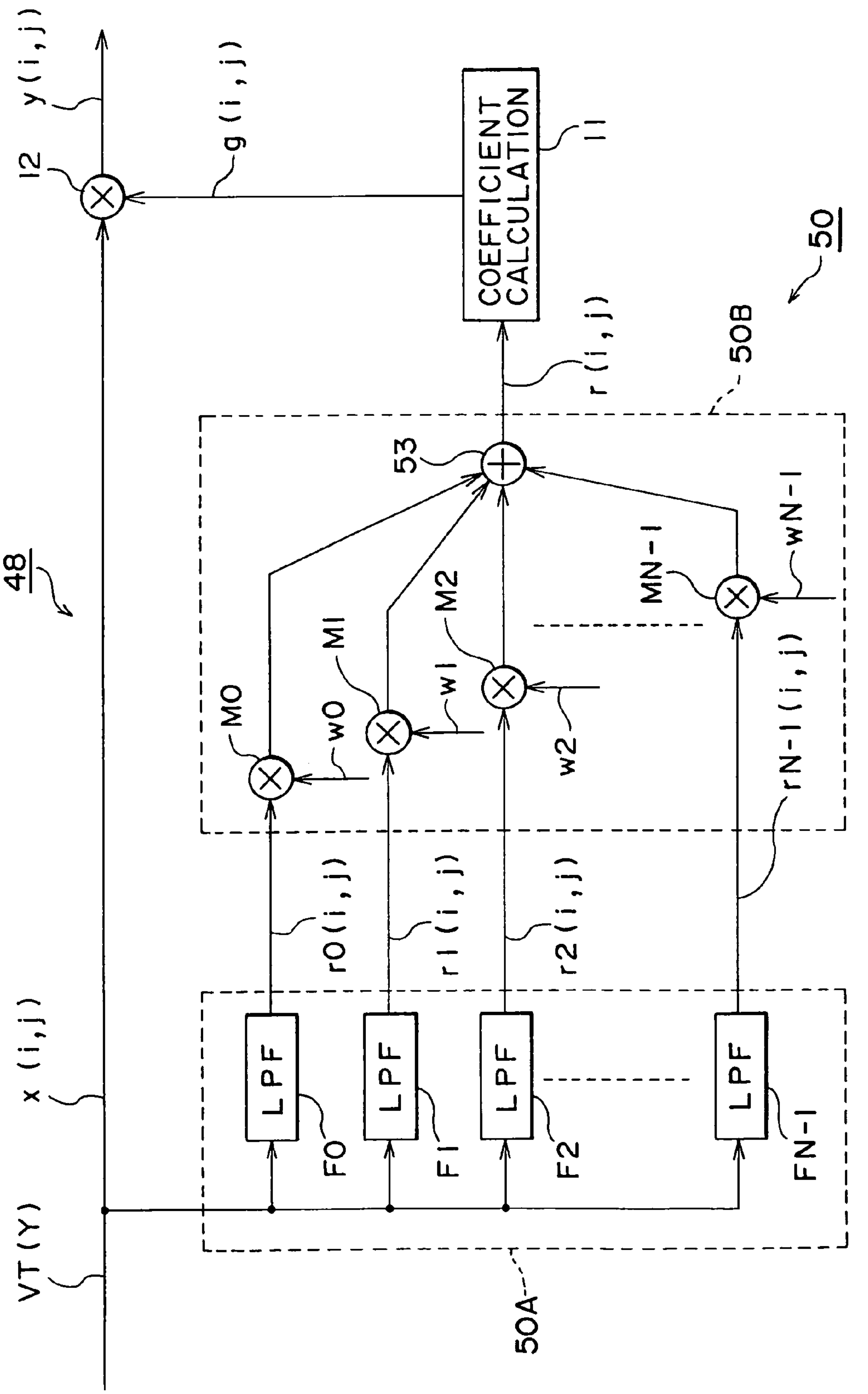
FIG. 9 is a block diagram illustrating a gradation compensating circuit adapted to the television camera in relation to the fourth embodiment of the present invention.

FIG. 9 is a block diagram illustrating the gradation compensating circuit adapted to the television camera in relation to the fourth embodiment of the present invention. This gradation compensating circuit 48 is adapted in place of the gradation compensating circuit 8 explained with reference to FIG. 1.

In this gradation compensating circuit 48, the domain judging filter 50 is composed of a low-pass filter 50A which outputs the results of judgment r0 (i, j), r1 (i, j), r2 (i, j), . . . , rN−1 (i, j) of the domains to which the input image data of different resolutions and the signal combining circuit 50B which generates the result of judgment r (i, j) which is the combining signal based on the results of judgment r0 (i, j), r1 (i, j), r2 (i, j), . . . , rN−1 (i, j) in different resolutions.

The low-pass filter 50A is composed of low-pass filters (LPF) F0, F1, F2, . . . , FN−1 of different passing frequency bandwidth and inputs the pixel value x (I, j) of the luminance signal Y generated from the image sensing result VT to each low-pass filter (LPF) F0, F1, F2, . . . , FN−1 and outputs the corresponding low frequency elements as the result of judgment r0 (i, j), r1 (i, j), r2 (i, j), . . . , rN−1 (i, j).

The signal combining circuit 50B respectively weights the results of judgment r0 (i, j), r1 (i, j), r2 (i, j), . . . , rN−1 (i, j) in the multiplying circuits M0, M1, M2, . . . , MN−1 and thereafter adds these results in the adding circuit 53 and thereby generates and outputs the result of judgment r(i, j) which is a combining signal. In this case, each weighting coefficient w0, w1, w2, . . . , wN−1 in the multiplying circuit M0, M1, M2, . . . , MN−1 is preset to satisfy the relationship of the following formula.

$$\sum_{k=0}^{N-1} wk = 1 \tag{11}$$

Therefore, in this embodiment, the contour in the image sensing result VT is never emphasized irregularly by the setting of the weighting coefficient w0, w1, w2, . . . , wN−1.

Figure 10A:
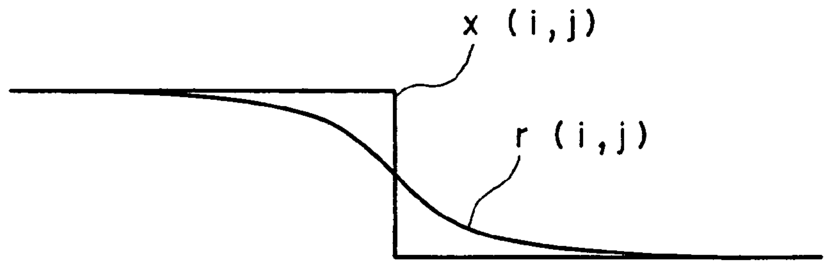
FIGS. 10A and 10B illustrate signal waveforms for explaining operations of a gradation compensating circuit of FIG. 9.
Figure 10B:
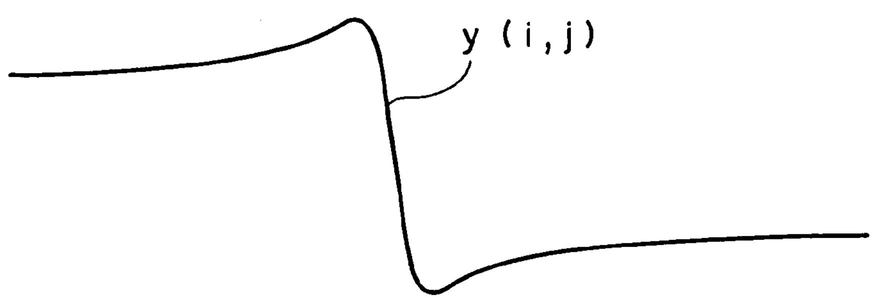

Namely, as illustrated in FIGS. 10A and 10B, when the pixel value x (i, j) changes rapidly (FIG. 10A), the signal level changes to alleviate such rapid change of pixel value in the low frequency element r (i, j). If the compensation coefficient g (i, j) is only generated by the output signal of the low-pass filter as in the case of the embodiment 1 while the signal level of the low frequency element r (i, j) is deviated to the high level side from the point of inflexion explained above in regard to FIG. 4, the pixel value is amplified by large gain immediately before the pixel value x (i, j) changes rapidly, the pixel value is amplified by small gain immediately after the pixel value x (i, j) changes rapidly, and thereby the output value y(i, j) of which contour is emphasized irregularly can then be obtained (FIG. 10B).

In this case, regarding such contour, emphasis of irregular contour can be reduced by compensating the pixel value with almost uniform gain.

Therefore, in this embodiment, the effect similar to that of the first embodiment can be obtained by effectively avoiding emphasis of irregular contour through generation of the compensation coefficient with the low frequency element of a plurality of systems.

According to the structure of FIG. 9, the effect similar to that of the first embodiment can be obtained by effectively avoiding emphasis of irregular contour through generation of the compensation coefficient with the low frequency element of a plurality of systems.

(5) Fifth Embodiment

Figure 11:
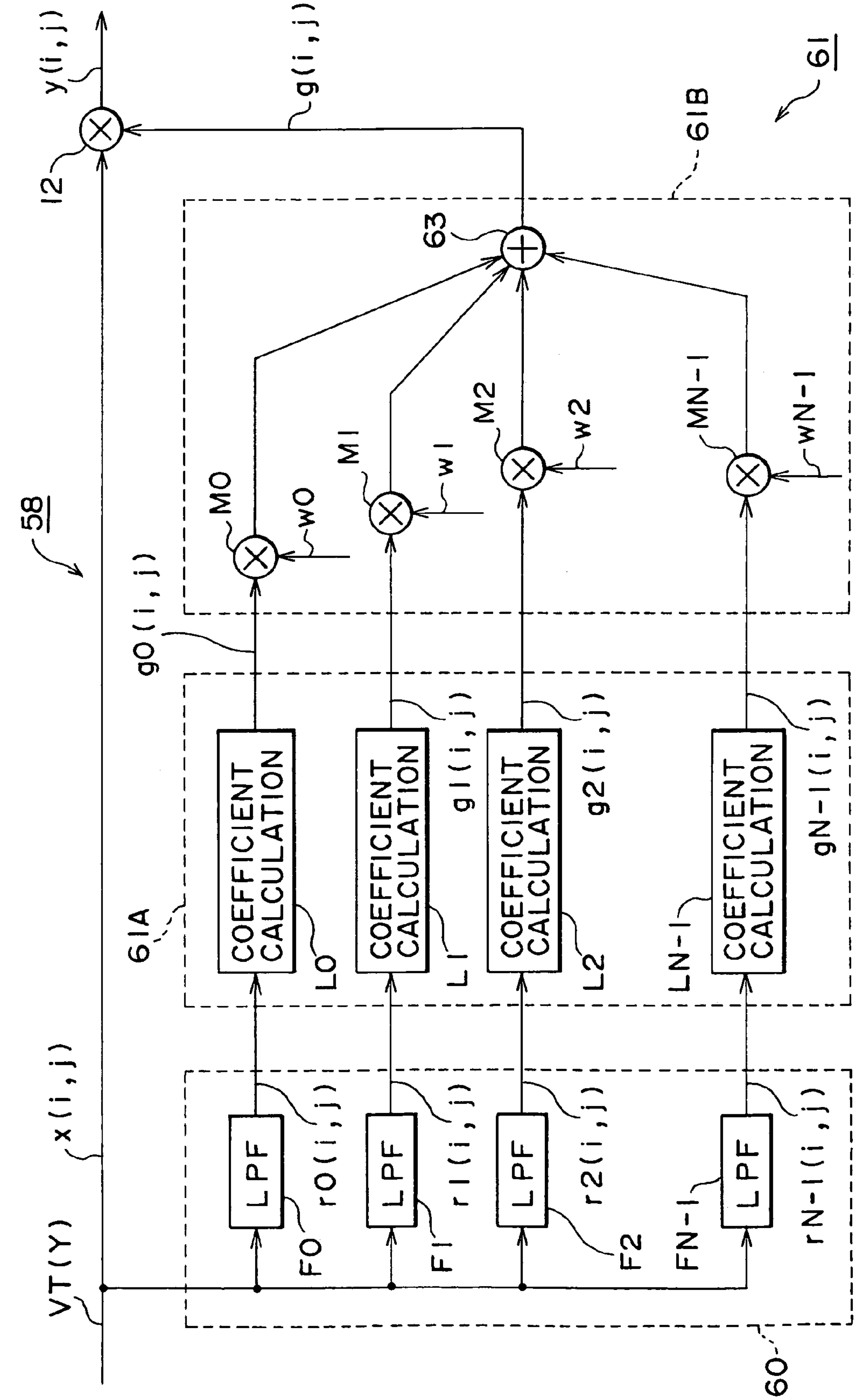
FIG. 11 is a block diagram illustrating a gradation compensating circuit adapted to the television camera in relation to the fifth embodiment of the present invention.

FIG. 11 is a block diagram illustrating the gradation compensating circuit adapted to the television camera in relation to the fifth embodiment of the present invention. This gradation compensating circuit 58 is adapted in place of the gradation compensating circuit 8 of FIG. 1.

In this gradation compensating circuit 58, the domain judging filter 60 outputs the results of judgment r0 (i, j), r1 (i, j), r2 (i, j), . . . , rN−1 (i, j) of different resolutions. Namely, the domain judging filter 60 is respectively composed of low-pass filters (LPF) F0, F1, F2, . . . , FN−1 of different passing frequency bandwidths and each low-pass filter (LPF) F0, F1, F2, . . . , FN−1 inputs the pixel value x (i, j) and outputs the corresponding low frequency element as the results of judgment r0 (i, j), r1 (i, j), r2 (i, j), . . . , rN−1 (i, j).

The coefficient calculating circuit 61 is composed of a coefficient generating circuit 61A which generates the corresponding compensation coefficients g0 (i, j), g1 (i, j), g2 (i, j), . . . , gN−1 (i, j) from the results of judgment r0 (i, j), r1 (i, j), r2 (i, j), . . . , rN−1 (i, j) and the coefficient combining circuit 61B which generates a compensation coefficient g(i, j) by combining these compensation coefficients g0 (i, j), g1 (i, j), g2 (i, j), . . . , gN−1 (i, j).

Of these circuits, the coefficient generating circuit 61A is composed of the coefficient calculating circuits L0, L1, L2, . . . , LN−1 which generate the corresponding compensation coefficients g0 (i, j), g1 (i, j), g2 (i, j), . . . , gN−1 (i, j) from the results of judgment r0 (i, j), r1 (i, j), r2 (i, j), . . . , rN−1 (i, j) respectively based on the predetermined coefficient calculating function Gk (k=0, 1, 2, . . . , N−1).

Meanwhile, the coefficient combining circuit 61B respectively weights the compensation coefficients g0 (i, j), g1 (i, j), g2 (i, j), . . . , gN−1 (i, j) with the multiplying circuits M0, M1, M2, . . . , MN−1 and thereafter adds these coefficients with the adding circuit 63 and thereby generates and outputs the compensation coefficient g(i, j) of 1. In this case, the weighting coefficients w0, w1, w2, . . . , wN−1 in the multiplying circuits M0, M1, M2, . . . , MN−1 are previously set to satisfy the relationship of formula (11).

According to the structure of FIG. 11, the effect similar to that of the fourth embodiment can also be obtained even by generating, after generation of the compensation coefficient from the low frequency element of a plurality of systems, the compensation coefficient of 1.

(6) Other Embodiments

Figures 12, 13:
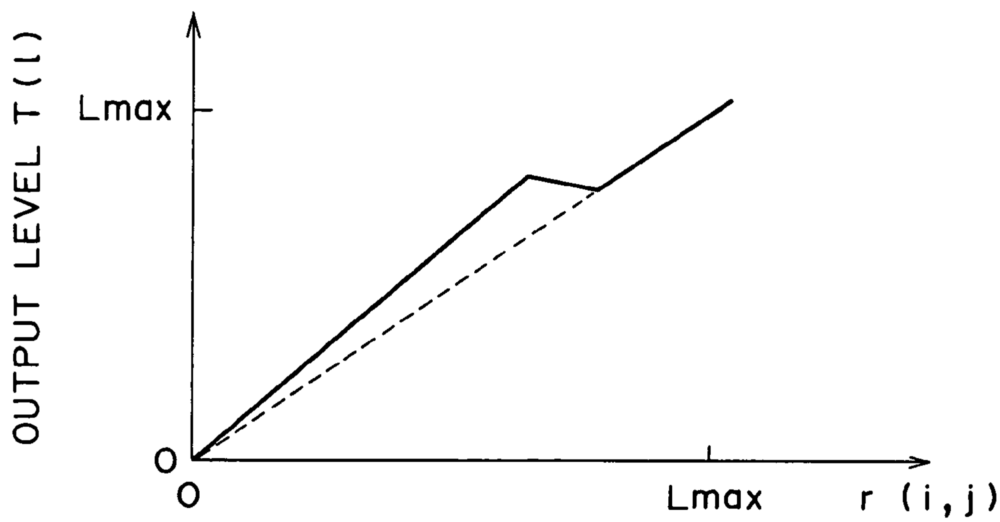
FIG. 12 illustrates a characteristic curve for explaining a level converting function adapted to a gradation compensating circuit in relation to the other embodiment.
FIG. 13 is a plan view for explaining a color filter.

In above embodiments, the compensation coefficient has basically been generated depending on the characteristics explained above with reference to FIG. 4, but the present invention is never limited thereto. The compensation coefficient may be generated depending on various input/output characteristics. For example, it is also possible to use the level converting function based on the input/output characteristics in which the output level is reduced in the course of increase of input level as illustrated in FIG. 12.

Namely, in the method of related art, when such function is used, a pseudo contour is generated in some cases in the image as the result of process because this function is not the function resulting in monotonous increase. However, when the domain is divided for processing by the low-pass filter as in the cases of the embodiments explained above, a large change of pixel value resulting in inverted relationship of the small and large pixel values can be prevented in the neighboring domains having the value of pixel value depending on the passing frequency bandwidth of the low-pass filter. Therefore, generation of pseudo contour can be avoided effectively.

In above embodiments, the coefficient calculating function G is generated by the arithmetic process of the formula (6) using the level converting function, but the present invention is never limited thereto and it is also possible that the coefficient calculating function G is freely set without use of the level converting function T.

In addition, in the embodiments explained above, after the gradation is compensated by the gradation compensating circuit, the dynamic range is then suppressed by the subsequent signal processing circuits. But the present invention is not limited thereto and it is also possible to execute these processes at a time by setting the corresponding coefficient calculating function G.

Namely, since it is requested in the process to suppress the dynamic range that the number of bits of pixel value output from the number of bits of the input pixel value is rather small, the maximum value of the output level is set to the allowable maximum value of the output image in the level converting function T and the coefficient calculating function G is generated using such maximum value. Thereby, these processes can be executed at a time.

Moreover, when the coefficient calculating function G is set freely without use of the level converting function T, it is enough to set the coefficient calculating function G to satisfy the following formula. Here, 1 indicates an input pixel level; $L_{max}$, the maximum value of input pixel level and $\mathbf{L0}_{max}$, the maximum value of the output pixel level.

$$1 \times G(1) \leq \mathrm{L0max}$$

$$0 \leq 1 \leq \mathrm{Lmax} \tag{12}$$

Moreover, in above embodiments, the quantizing circuit, look-up table and interpolating circuit are used in the second and third embodiments, but the present invention is not limited thereto. Namely, all or any one of the quantizing circuit, look-up table and interpolating circuit may also be adapted to the embodiments other than the second and third embodiments.

On the contrary, the quantizing circuit may be avoided as required in the second and third embodiments.

Figure 14:
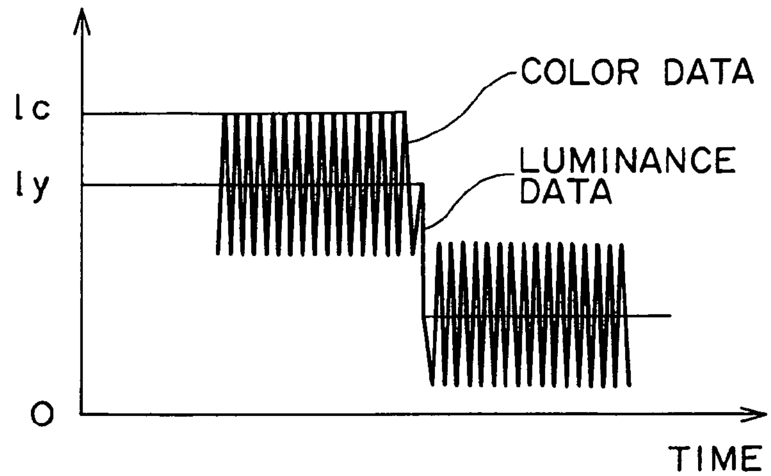
FIG. 14 illustrates signal waveforms showing the result of image sensing when the color filter of FIG. 13 is used.

Moreover, in above embodiments, the luminance signal is generated from a color signal and gradation of color signal is compensated with reference to this luminance signal. However, the present invention is not limited thereto. The present invention can widely be adapted, for example, on the occasion of processing the image sensing result (FIG. 14) in which the amplitude-modulated color signal is superimposed on the luminance signal output from a single plate type solid-state image sensing device through the setting of the color filter illustrated in FIG. 13, or when the video signal consisting of the luminance signal and color difference signal is processed or when the synthetic video signal in which the chroma signal is superimposed on the luminance signal is processed.

For example, when the image sensing result in which the amplitude-modulated color signal is superimposed on the luminance signal is processed, color noise can effectively be avoided to compensate for the gradation by setting resolution of the compensation coefficient lower than the modulation frequency of the color signal.

In addition, when the video signal consisting of the luminance signal and color difference signal is processed, the compensation coefficient is calculated based on the luminance signal and the gradation of the luminance signal and color difference signal is compensated depending on such compensation coefficient. Thereby, the gradation of the video signal of this type can be compensated accurately.

Moreover, in above embodiments, the domain to which the input image data belongs is judged by a low-pass filter and the low frequency element output from this low-pass filter is used as the result of judgment. However, the present invention is not limited thereto. The effect similar to that of the embodiments explained above can also be obtained by dividing the domain of the processing object image with various processing methods, for example, in such a case that similarity between the freely selected pixels and neighboring pixels around such selected pixels in the processing object image is detected as the characteristic amount, the domain is sequentially expanded from such pixels and such processing object image domain is further divided and the characteristic amount of such domains is used as the result of judgment.

Moreover, in above embodiments, the present invention is adapted to the television camera, but the present invention is not limited thereto. Namely, the present invention can widely be adapted to various image processors such as television receiver, video tape recorder and printer or the like.

According to the present invention, the domain to which the input image data belongs is judged, for example, with reference to the low frequency element of pixel value and the signal level of image data is compensated based on the result of judgment. Thereby, drop of partial contrast can effectively be avoided and gradation can also be compensated.

What is claimed is:

1. An image processor for compensating gradation of image data, comprising:

domain judging means for judging a domain to which said image data belongs in order to output the result of judgment;

coefficient calculating means for outputting a compensation coefficient to compensate a pixel value of said image data based on said result of judgment; and compensating means for compensating a pixel value of said image data depending on said compensation coefficient, wherein said domain judging means includes a plurality of low-pass filters respectively extracting low frequency elements of said image data and signal combining means for generating a combining signal of 1 based on the low frequency element output from a plurality of said low-pass filters and said coefficient calculating means generates said compensation coefficient based on said combining signal, wherein each of said plurality of said low pass filters has a weighing coefficient wherein the sum of the weighing coefficients for said plurality of said low pass filters equals one.

2. An image processor as claimed in claim 1, wherein said signal combining means generates said combining signal using a weighted mean of low frequency elements output from a plurality of said low-pass filters.

3. An image processor as claimed in claim 1, wherein said signal combining means generates said combining signal through weighted addition of the low frequency elements output from a plurality of said low-pass filters.

4. An image processing method for compensating for gradation of image data comprising:

domain judging process to output the result of judgment by judging a domain to which said image data belongs;

coefficient calculating process to output the compensation coefficient for compensating for the pixel value of said image data on the basis of said result of judgment; and compensating process to compensate for the pixel value of said image data corresponding to said compensation coefficient, wherein said domain judging process includes a low frequency element extracting process to extract a plurality of low frequency elements of said image data in different frequency bands and a signal combining process to generate a combining signal based on a plurality of said low frequency elements, and said coefficient calculating process generates said compensation coefficient based on said combining signal, wherein each of said plurality of said low pass filters has a weighing coefficient wherein the sum of the weighing coefficients for said plurality of said low pass filters equals one.

5. An image processing method as claimed in claim 4, wherein said signal combining process generates said combining signal with a weighted mean of a plurality of said low frequency elements.

6. An image processing method as claimed in claim 4, wherein said signal combining process generates said combining signal with weighted addition of a plurality of said low frequency elements.

* * * * *